United States Patent
Chen et al.

(10) Patent No.: US 8,007,161 B2
(45) Date of Patent: Aug. 30, 2011

(54) BACKLIGHT MODULE

(75) Inventors: Fu-Tung Chen, Taoyuan County (TW); Shih-Che Fu, Chiayi (TW); Chih-Chia Chen, Taipei County (TW); Chung-Te Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 261 days.

(21) Appl. No.: 12/344,593

(22) Filed: Dec. 29, 2008

(65) Prior Publication Data

US 2010/0079981 A1  Apr. 1, 2010

(30) Foreign Application Priority Data

Sep. 26, 2008  (TW) .................................. 97137211

(51) Int. Cl.
*F21V 7/04* (2006.01)
*G02F 1/1333* (2006.01)

(52) U.S. Cl. ......... 362/632; 362/97.1; 362/362; 349/58; 349/60

(58) Field of Classification Search ........ 362/97.1–97.4, 362/362, 632–634; 349/58, 60
See application file for complete search history.

(56) References Cited

U.S. PATENT DOCUMENTS

| | | | | |
|---|---|---|---|---|
| 6,857,759 B2 * | 2/2005 | Lee et al. | ...................... | 362/225 |
| 6,974,221 B2 * | 12/2005 | Wu et al. | .......................... | 362/29 |
| 7,407,318 B2 * | 8/2008 | Chang | ............................ | 362/632 |
| 7,413,324 B2 * | 8/2008 | Chang | ............................ | 362/225 |
| 7,510,318 B2 * | 3/2009 | Chen | ............................. | 362/634 |
| 7,594,747 B2 * | 9/2009 | Tsai et al. | ...................... | 362/634 |
| 2002/0044437 A1 * | 4/2002 | Lee | ................................. | 362/31 |
| 2004/0257792 A1 * | 12/2004 | Yu et al. | .......................... | 362/31 |
| 2006/0007707 A1 * | 1/2006 | Lee et al. | ....................... | 362/632 |
| 2006/0104083 A1 | 5/2006 | Kwon | | |
| 2006/0158905 A1 * | 7/2006 | Lai et al. | ........................ | 362/634 |
| 2006/0171140 A1 * | 8/2006 | Bae | .................................. | 362/29 |
| 2006/0268191 A1 * | 11/2006 | Hsieh | .............................. | 349/58 |
| 2008/0049161 A1 | 2/2008 | Kim et al. | | |

FOREIGN PATENT DOCUMENTS

| | | |
|---|---|---|
| CN | 1648741 | 8/2005 |
| CN | 1959500 | 5/2007 |
| TW | I255896 | 6/2006 |
| TW | I287676 | 10/2007 |

OTHER PUBLICATIONS

"1st Office Action of China counterpart application", issued on Jan. 8, 2010, p. 1-p. 5.

* cited by examiner

*Primary Examiner* — Anabel Ton
*Assistant Examiner* — Danielle Allen
(74) *Attorney, Agent, or Firm* — Jianq Chyun IP Office

(57) ABSTRACT

A backlight module is provided. The backlight module includes a backplate, at least one supporter, and a plurality of light emitting devices. The supporter is disposed on the backplate, and includes a supporting portion and a buffering portion. The supporting portion is disposed between the buffering portion and the backplate. The elastic coefficient of the buffering portion is smaller than the elastic coefficient of the supporting portion. The light emitting devices are also disposed on the backplate. The supporter is disposed between the light emitting devices. The buffering portion of the supporter of the backlight module is adapted for buffering an external force applied upon the supporting porter or the element disposed thereupon.

13 Claims, 6 Drawing Sheets

BACKLIGHT MODULE

CROSS-REFERENCE TO RELATED APPLICATION

This application claims the priority benefit of Taiwan application serial no. 97137211, filed Sep. 26, 2008. The entirety of the above-mentioned patent application is hereby incorporated by reference herein and made a part of this specification.

BACKGROUND OF THE INVENTION

1. Field of the Invention

The present invention generally relates to a backlight source, and more particularly, to a backlight module having a buffering supporter.

2. Description of Related Art

With fast development of the displaying technology, people, facilitated with those developed display devices, are living with more convenience. Flat panel displays (FPD), having the advantages of light-weight and thin-volume, have become the main stream of the display market. Comparing with most other kinds of FPDs, liquid crystal displays (LCD) have presented superior characteristics, such as better space utilization, lower power consumption, non-radiation, and lower electromagnetic interference (EMI), and thus are widely welcome by consumers. LCDs are not self-emissive displays, and therefore they have to work together with additional light sources when displaying images. Generally, a typical LCD is often provided with a backlight module for providing a light source to an LCD panel thereof.

FIG. 1 shows a partial cross-sectional view of a conventional backlight module. Referring to FIG. 1, a backlight module 100 includes a backplate 110, a plurality of supporters 120, and a plurality of lamp tubes 130. The lamp tubes 130 are held by tube racks 150, and are disposed over the backplate 110. The supporters 120 are disposed between the lamp tubes 130. Typically, the supporters 120 and the tube racks 150 are often integrally configured together by an injection molding process and disposed on a substrate 160. With the above design, the supporters 120, the tube racks 150 and the substrate 160 are in fact an integrally formed structure. Further, the backlight module 100 is often equipped with a reflection sheet 140, and optical sheets 170 for example including a diffusion sheet, a brightness enhancement film, or a prism sheet. The reflection sheet 140 and the optical sheets 170 are adapted for processing the light source provided by the lamp tubes 130 to obtain a plane light source having a uniform brightness and a high luminous efficiency.

Moreover, the optical sheets 170 are usually supported by the supporters 120 and disposed in the backlight module 100. In other words, the optical sheets 170 are direct contact with the supporters 120. Therefore, when the backlight module 100 is configured with an external force, a friction between the optical sheets 170 and the supporters 120 may be caused. As such, the optical sheets 170 are often worn by the supporters 120, and thus are likely to be damaged. When the backlight module 100 of the LCD has such damaged optical sheets 170, images displayed by the LCD may present unsatisfactory displaying performance at where the damage occurs.

SUMMARY OF THE INVENTION

Accordingly, the present invention is to provide a backlight module having a supporter, wherein the supporter includes a buffering portion. The backlight module is adapted for applying in a display, for improving a displaying performance of the display.

The present invention provides a backlight module. The backlight module includes a backplate, at least one supporter, and a plurality of light emitting devices. The supporter is disposed on the backplate, and includes a supporting portion and a buffering portion. The supporting portion is disposed between the buffering portion and the backplate. The elastic coefficient of the buffering portion is smaller than the elastic coefficient of the supporting portion. The light emitting devices are also disposed on the backplate. The supporter is disposed between the light emitting devices.

According to an embodiment of the present invention, a material of the supporting portion is polycarbonate (PC), and a material of the buffering portion is thermoplastic polyurethane (TPU).

According to an embodiment of the present invention, one side of the supporting portion, adjacent to the buffering portion, is configured as a flat surface.

According to an embodiment of the present invention, the supporting portion has a recess at one side of the supporting portion adjacent to the buffering portion and a part of the buffering portion is located inside the recess.

According to an embodiment of the present invention, the buffering portion has a recess at one side of the buffering portion adjacent to the supporting portion and a part of the supporting portion is located inside the recess.

According to an embodiment of the present invention, a height of the buffering portion is substantially equal to a height of the supporting portion.

According to an embodiment of the present invention, a height of the buffering portion is substantially smaller than a height of the supporting portion.

According to an embodiment of the present invention, the backlight module further includes a reflection sheet disposed on the backplate and facing toward the light emitting devices.

According to an embodiment of the present invention, the light emitting devices are lamp tubes. In one embodiment, the backlight module further includes a plurality of tube racks. The tube racks are disposed on the backplate for holding the lamp tubes. In a further embodiment, the backlight module further includes a substrate. The substrate is disposed on the backplate, and the tube racks and the supporter are disposed on the substrate. The supporting portion and the substrate are integrally formed. In a still further embodiment, the substrate includes a body and a plurality of check portions. The body and the check portions are configured at two opposite sides of the backplate, respectively, so that the substrate can be engaged to the backplate.

According to an embodiment of the present invention, the backlight module further includes at least one optical sheet, disposed on the buffering portion.

According to the present invention, the supporter of the backlight module has a buffering portion having a small elastic coefficient for buffering the friction between the optical sheet and the supporter, thus relieving the damage caused to the optical sheet. When applying in a display, the backlight module according to the present invention is adapted for improving the displaying performance of the display.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
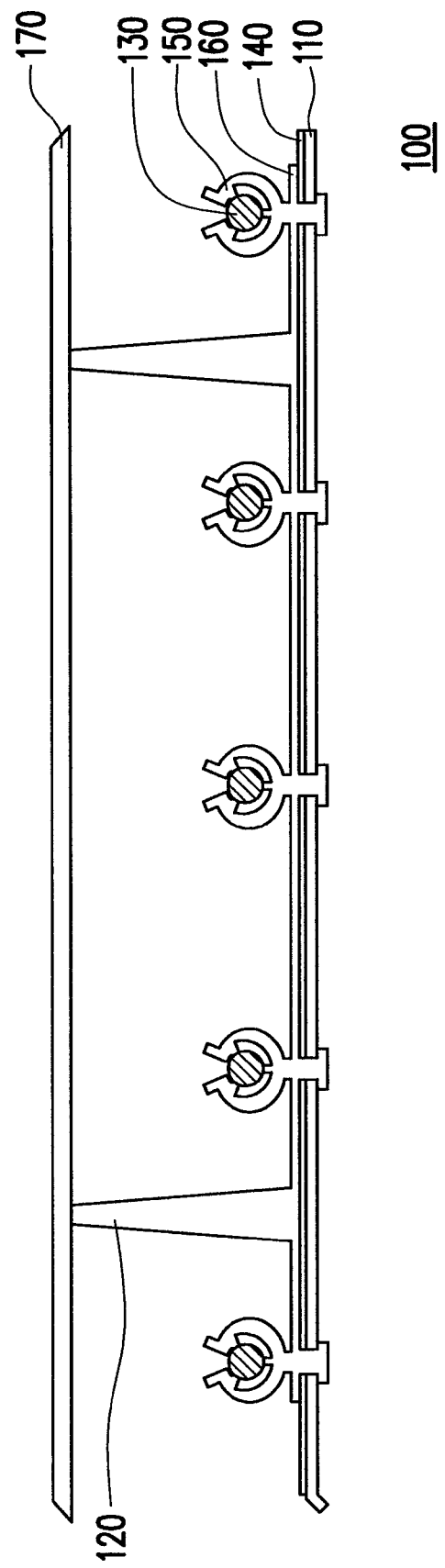
FIG. 1 shows a partial cross-sectional view of a conventional backlight module.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2A:
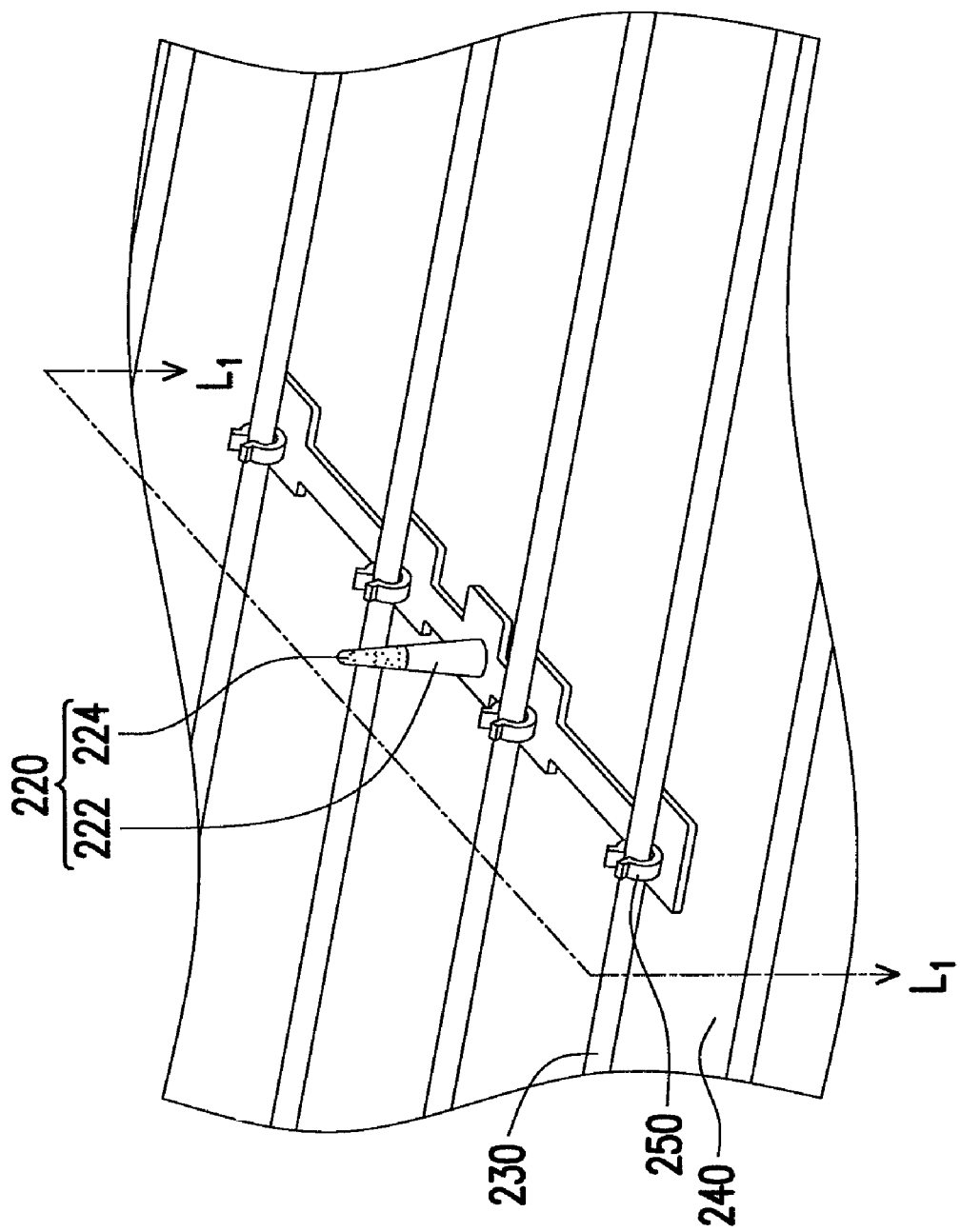
FIG. 2A is a partial schematic view of a backlight module according to a first embodiment of the present invention.
Figure 2B:
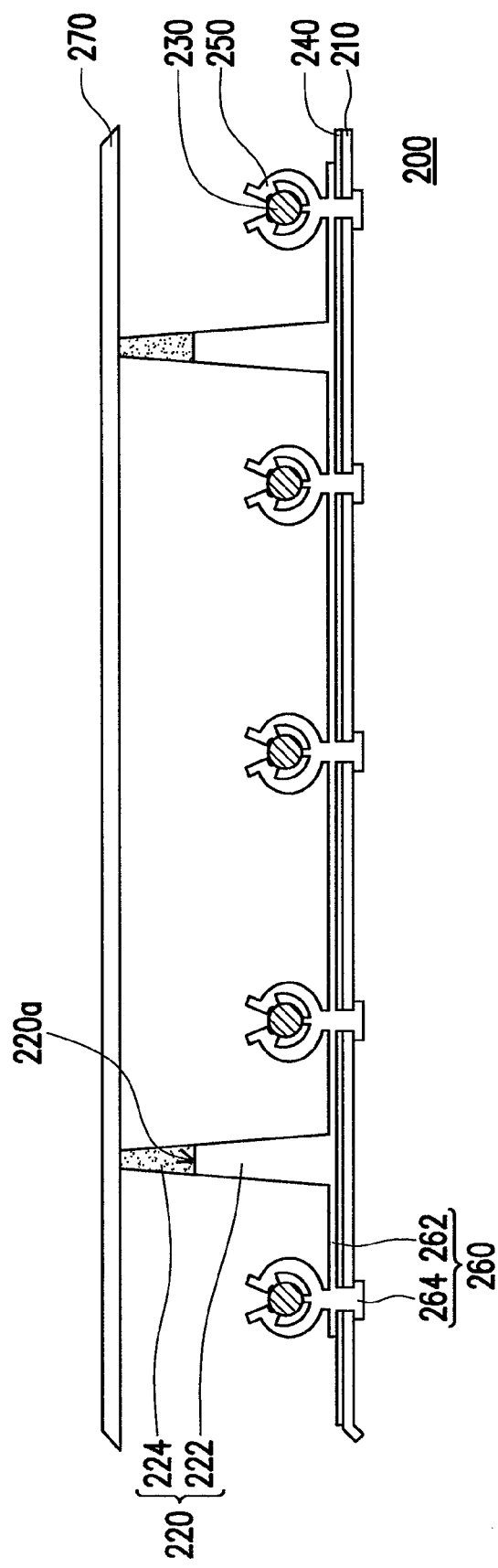
FIG. 2B is a partial cross-sectional view of FIG. 2A along cutting line $L_1$-$L_1$.

FIG. 2A is a partial schematic view of a backlight module according to a first embodiment of the present invention. FIG. 2B is a partial cross-sectional view of FIG. 2A along cutting line $L_1$-$L_1$. Referring to FIGS. 2A and 2B together, a backlight module 200 is shown. The backlight module 200 includes a backplate 210, at least one supporter 220, and a plurality of light emitting devices 230. The supporter 220 is disposed on the backplate 210. The light emitting devices 230 are disposed on the backplate 210. The supporter 220 is disposed between the light emitting devices 230. The light emitting devices 230 are adapted for providing a light source. The backlight module 200 may further include a reflection sheet. When the reflection sheet 230 is disposed on the backplate 210, facing toward the light emitting devices 230, linear light sources provided by the light emitting devices 230 can be reflected by the reflection sheet 240 to obtain a uniform plane light source.

In the present embodiment, the light emitting devices 230 for example are lamp tubes, and the backlight module 200 further includes tube racks 250 for holding the lamp tubes. In other words, the lamp tubes are disposed inside the backlight module 200 by the tube racks 250 on the backplate 210. In practice, an injection molding process can be conducted to integrally form the tube racks 250 and the supporter 220 together on a substrate 260, so as to connect the tube racks 250 and the supporter 220 to the substrate 260. In such a way, the tube racks 250 and the supporter 220 are disposed on the backplate 210 by disposing the substrate 260 on the backplate 210. The substrate 260 for example is a disposed on the reflection sheet 240, so that the reflection sheet 240 is disposed between the substrate 260 and the backplate 210.

Figure 2C:
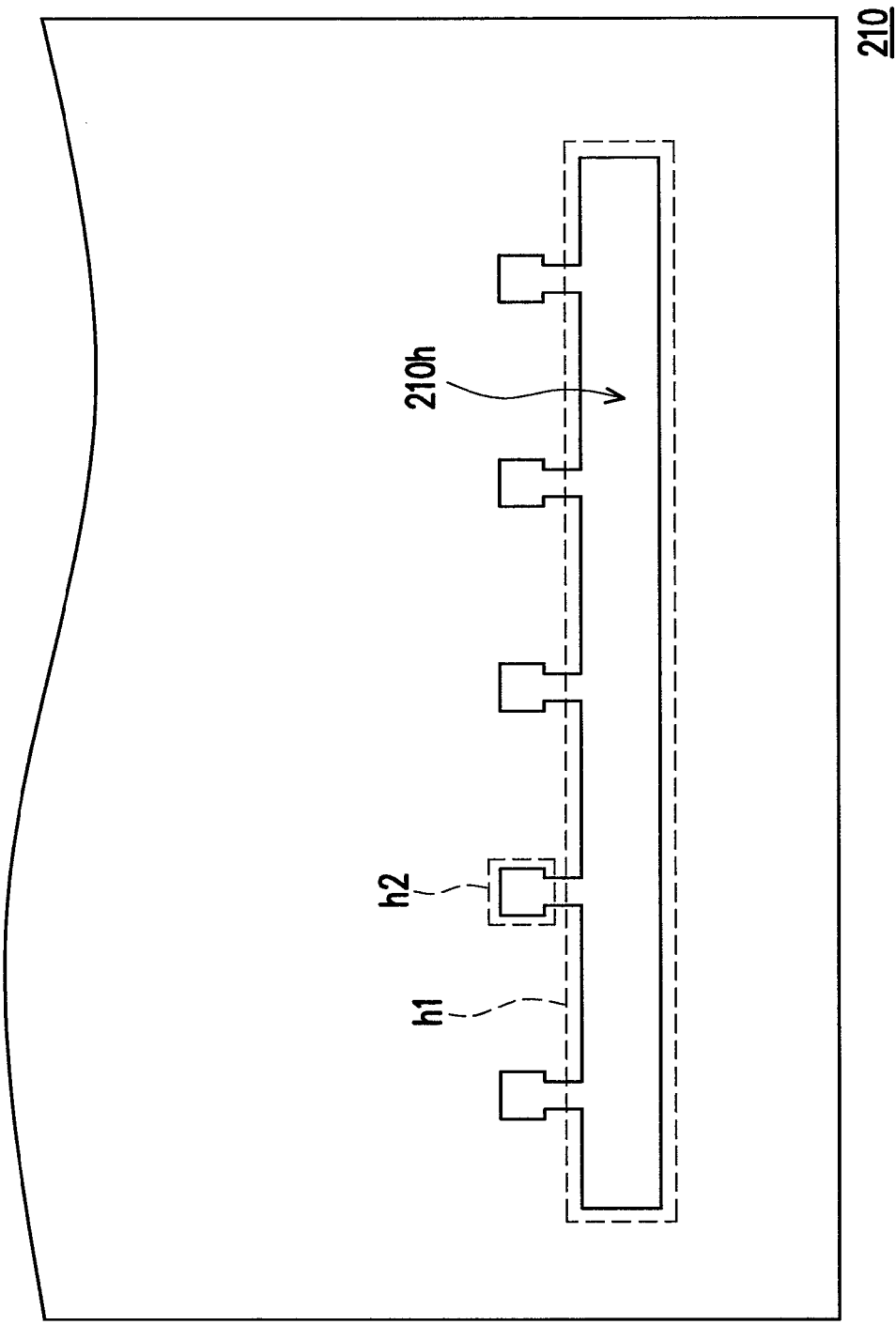
FIG. 2C is a partial top view illustrating a backplate of the FIG. 2B.

Further, the substrate 260 for example includes a body 262 and a plurality of check portions 264. The body 262 and the check portions 264 are configured at two opposite sides of the backplate 210, respectively, so that the substrate 260 can be engaged to the backplate 210. FIG. 2C is a partial top view illustrating a backplate of the FIG. 2B. Referring to FIGS. 2B and 2C together, the backplate 210 of the current embodiment is configured with an opening 210h, by which the substrate 260 can be engaged to the backplate 210. For convenience of illustration, the opening 210h depicted as including openings h1 and h2, which are marked according to their relative positions. Specifically, the opening h1 is adapted for allowing the substrate 260 passing therethrough. After the substrate 260 passes through the opening h1, the body 262 and the check portions 264 are disposed at two opposite sides of the opening h1. When an external force is applied to the substrate 260, the substrate 260 can be moved from the opening h1 to the opening h2, so that the substrate 260 and the backplate 210 are interfered to each other. The interference between the substrate 260 and the backplate 210 fixes the substrate 260 to the opening h2, avoiding the substrate 260 from being detached from the backplate 210.

Referring to FIG. 2B again, the supporter 220 includes a supporting portion 222 and a buffering portion 224. One side of the supporting portion 222, adjacent to the buffering portion 224, is configured with a flat surface 220a. As discussed above, in the present embodiment, the substrate 260, the tube racks 250, and the supporter 220 for example are formed by an injection molding process, in which the supporting portion 222 and the substrate 260 for example are integrally formed. Further, the buffering portion 224 and the supporting portion 222 can be formed together during the injection molding process. A hot melting effect associated with the injection molding process improves the strength of combination between the buffering portion 224 and the supporting portion 222, thus preventing the buffering portion 224 from dropping off from the supporting portion 222. In such a way, the yield of supporters 220 can be improved, and thus the overall fabrication cost of the backlight module 200 is decreased. Further, the aforementioned method of hot melting can even replace the conventional method of using glue to bond the buffering portion 224 and the supporting portion 222, thus further simplifying the fabrication process of the backlight module 200.

In the present embodiment, the backlight module 200 further includes a plurality of optical sheets 270. The optical sheets 270 for example include a diffusion sheet, a brightness enhancement sheet, a prism sheet, or a combination of thereof, The optical sheets 270 are provided for improving a luminous efficiency and a brightness uniformity of the backlight module 200. Whenever the optical sheets 270 are damaged or deformed by external forces, the lighting performance of the backlight module 200 will induce negative effect. As can be seen from FIG. 2B, the optical sheets 270 are disposed on the supporter 220. Therefore, the supporter 220 provides a suitable support to the optical sheets 270 to prevent the optical sheets 270 from deformity by its own gravity. On the other hand, the supporter 220 should not be too hard, which causes abrasive wear to the optical sheets 270.

As such, in the present embodiment, the optical sheets 270 are disposed on the buffering portion 224 of the supporter 220. The supporting portion 222 is deposed between the buffering portion 224 and the backplate 210. It should be noted that in the present embodiment the elastic coefficient of the buffering portion 224 is substantially smaller than that of the supporting portion 222. For example, if the supporting portion is made of polycarbonate (PC), then the buffering portion 224 can be made of thermoplastic polyurethane (TPU) which has a lower elastic coefficient than PC. Specifically, in the present embodiment, the optical sheets 270 is provided over the buffering portion 224 of the supporter 220, and is contact with the buffering portion 224 having a smaller elastic coefficient. In such a way, the buffering portion 224 is adapted to provide a buffer for relieving the friction between the optical sheets 270 and the supporter 220, thus further alleviating the damage caused to the optical sheets 270.

From the above description of the present embodiment, the supporter 220 achieves supporting and buffering functions at the same time by employing the combination of the supporting portion 222 and the buffering portion 224. However, considering the material characteristics, the strength of the buffering portion 224 is less than the strength of the supporting portion 222. In other words, in the present embodiment, the supporting portion 222 provides more contribution in supporting the optical sheets 270 than the buffering portion 224 does. Therefore, the supporter 220 is provided with a buffering portion 224 for avoiding the element supported thereupon from being worn, and is further adapted for providing a suitable support to the element supported thereupon to prevent the element from being deformed by external forces.

In practice, it is preferred to consider both of the supporting function and the buffering function when designing the proportion between the supporting portion 222 and the buffering portion 224 of the supporter 222. Specifically, when the buffering portion 224 is designed to have a height substantially equal to or smaller than a height of the supporting portion 222, the supporter 220 presents a better support capability to prevent an occurrence of insufficient support thereby.

Second Embodiment

Figure 3:
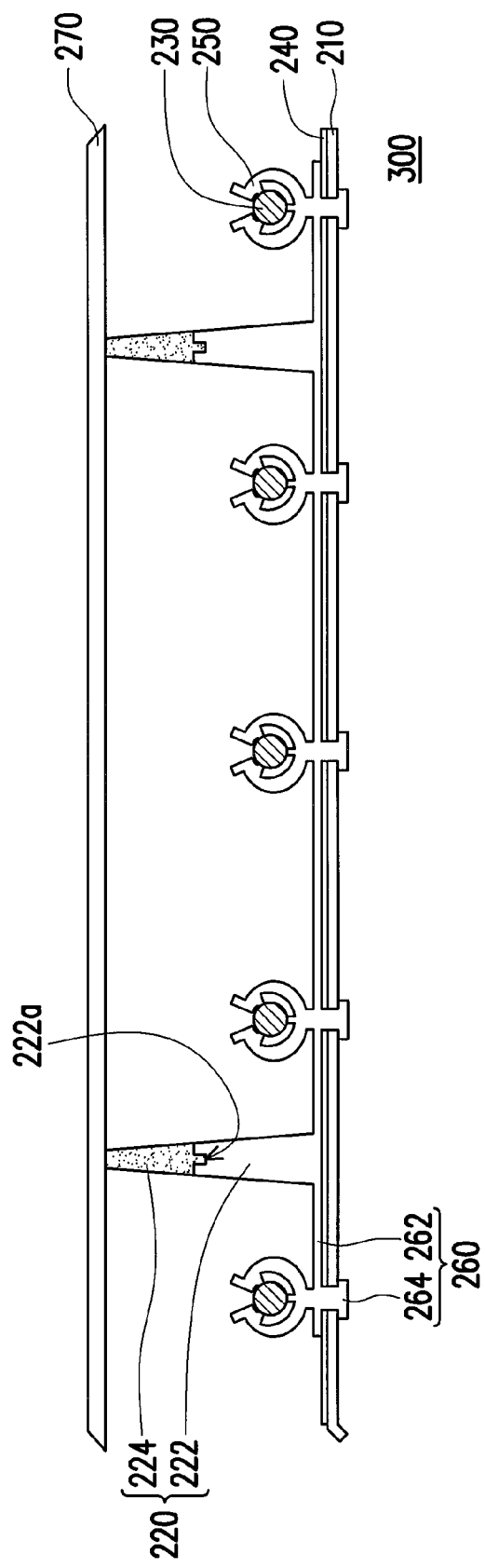
FIG. 3 is a partial cross-sectional view of a backlight module according to a second embodiment of the present invention.

FIG. 3 is a partial cross-sectional view of a backlight module according to a second embodiment of the present invention. Referring to FIG. 3, it shows a backlight module 300 similar to the backlight module 200 of the first embodiment. The difference between the two embodiments is the configuration of the conjunction of the supporting portion 222 and the buffering portion 224.

As shown in FIG. 3, the supporting portion 222 has a recess 222a at one side of the supporting portion 222 adjacent to the buffering portion 224 and a part of the buffering portion 224 is located in the recess 222a. In practice, the recess 222a for example is configured at the side of the supporting portion 222 apart from the substrate 260. Specifically, during the injection molding process, the supporting portion 222 having a recess 222a is fixed in a mold. Then a material for making the buffering portion 224, e.g., TPU, is injected into the mold to form the buffering portion 224 on the supporting portion 222 in the mold. In such a way, the part of buffering portion 224 received in the recess 222a is tightly bonded to the supporting portion 222 because of a local hot melting effect.

Further, with respect to the material characteristics, the elastic coefficient of the buffering portion 224 is smaller than the elastic coefficient of the supporting portion 222. That is, the supporting portion 222 is made of a material stronger than the buffering portion 224. When the buffering portion 224 is configured with a height substantially equal to or smaller than a height of the supporting portion 222, the supporter 220 is adapted to provide an optimal supporting function. Further, because of the configuration of the recess 222a of the supporting portion 222, the supporting portion 222 and the buffering portion 224 are enchased each other, so that the supporting portion 222 and the buffering portion 224 interfere one to another. Such an interference between the supporting portion 222 and the buffering portion 224 strengthens the combination therebetween, thus preventing the supporting portion 222 from detaching off from the buffering portion 224.

More details or other elements of the current embodiment can be taken by referring to the discussion in the first embodiment, in which the same reference numbers are used in the drawings and the description to refer to the same or like parts, and are not to be iterated hereby.

Third Embodiment

Figure 4:
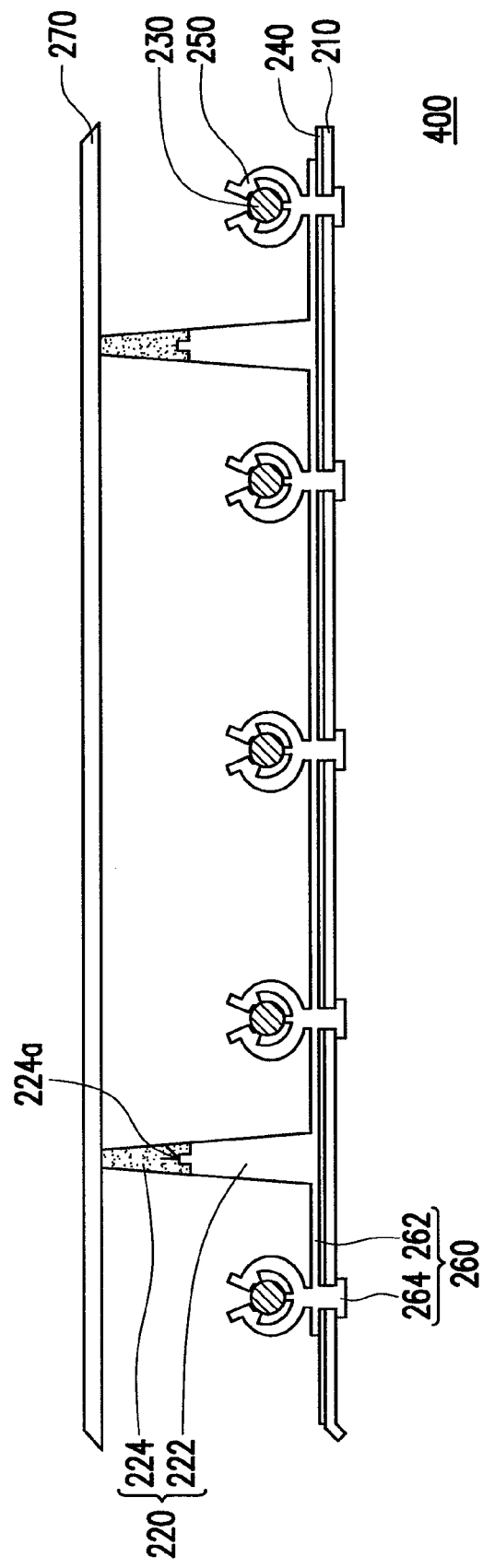
FIG. 4 is a partial cross-sectional view of a backlight module according to a third embodiment of the present invention.

FIG. 4 is a partial cross-sectional view of a backlight module according to a third embodiment of the present invention. Referring to FIG. 4, it shows a backlight module 400 similar to the backlight module 200 of the first embodiment and the backlight module 300 of the second embodiment. The difference between the two embodiments is the configuration of the conjunction of the supporting portion 222 and the buffering portion 224.

As shown in FIG. 4, the buffering portion 224 has a recess 224a at one side of the buffering portion 224 adjacent to the supporting portion 222 and a part of the supporting portion 222 is located in the recess 224a. In other words, in the present embodiment, the supporting portion 222 and the buffering portion 224 are also interfered to each other. And the interference between the supporting portion 222 and the buffering portion 224 can also strengthen the combination between the supporting portion 222 and the buffering portion 224 and avoid the detachment of the two parts. Further, in the present embodiment, with respect to the material characteristics, the elastic coefficient of the buffering portion 224 is smaller than the elastic coefficient of the supporting portion 222. That is, the supporting portion 222 is made of a material harder than the buffering portion 224. When the buffering portion 224 is configured with a height substantially equal to or smaller than a height of the supporting portion 222, the supporter 220 is adapted to provide an optimal supporting function.

Generally, the recess 222a and the recess 224a are neither restricted to be one or more than one, nor restricted to be configured with a certain shape. In fact, an interface of the bonding connection between the supporting portion 222 and the buffering portion 224 can be configured with an even form or an uneven form. When the interface of the bonding connection between the supporting portion 222 and the buffering portion 224 is uneven, the interference between the supporting portion 222 and the buffering portion 224 strengthens the combination of the bonding connection therebetween, thus improving the mechanical strength of the structure.

More details or other elements of the present embodiment can be taken by referring to the discussion in the first embodiment, in which the same reference numbers are used in the drawings and the description to refer to the same or like parts, and are not to be iterated hereby.

In summary, the present invention provides a backlight module including a supporter. The supporter includes a supporting portion and a buffering portion. The elastic coefficient of the buffering portion is smaller than that of the supporting portion. As such, the present invention provides a buffer to relieve the friction between the optical sheets and the supporter, thus alleviating the damage caused to the optical sheets. When employed in a display, the backlight module of the present invention is adapted for improving the unsatisfactory displaying performance caused by external forces applied upon the supporter. Further, adaptively modifying the configuration of the bonding connection between the supporting portion and the buffering portion further improves the combination therebetween, and thus improving the yield and saving the fabrication cost thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a backplate;
   at least one supporter, disposed on the backplate, and comprising a supporting portion, a buffering portion, and a hot melting portion, and the supporting portion and the buffering portion being pillar-like and being connected by the hot melting portion, wherein the supporting portion is deposed between the buffering portion and the backplate, and the elastic coefficient of the buffering portion is smaller than the elastic coefficient of the supporting portion; and
   a plurality of light emitting devices, disposed on the backplate, wherein the supporter is disposed between the light emitting devices.

2. The backlight module according to claim 1, wherein a material of the supporting portion is polycarbonate (PC), and a material of the buffering portion is thermo-plastic polyurethane (TPU).

3. The backlight module according to claim 1, wherein a side of the supporting portion, adjacent to the buffering portion, is configured as a flat surface.

4. The backlight module according to claim 1, wherein the supporting portion has a recess at a side of the supporting portion adjacent to the buffering portion, and a part of the buffering portion is located inside the recess.

5. The backlight module according to claim 1, wherein the buffering portion has a recess at a side of the buffering portion adjacent to the supporting portion, and a part of the supporting portion is located inside the recess.

6. The backlight module according to claim 1, wherein a height of the buffering portion is substantially equal to a height of the supporting portion.

7. The backlight module according to claim 1, wherein a height of the buffering portion is substantially smaller than a height of the supporting portion.

8. The backlight module according to claim 1, further comprising a reflection sheet disposed on the backplate and facing toward the light emitting devices.

9. The backlight module according to claim 1, wherein the light emitting devices are lamp tubes.

10. The backlight module according to claim 9, further comprises a plurality of tube racks disposed on the backplate for holding the lamp tubes.

11. The backlight module according to claim 10, further comprises a substrate disposed on the backplate, the tube racks and the supporter are disposed on the substrate, and the supporting portion and the substrate are integrally formed.

12. The backlight module according to claim 11, wherein the substrate comprises a body and a plurality of check portions, and the body and the check portions are configured at two opposite sides of the backplate, respectively, so that the substrate can be engaged to the backplate.

13. The backlight module according to claim 1, further comprises at least one optical sheet, disposed on the buffering portion.

* * * * *